United States Patent [19]

Sierakowski et al.

[11] Patent Number: 5,207,996

[45] Date of Patent: May 4, 1993

[54] ACID LEACHING OF COPPER ORE HEAP WITH FLUOROALIPHATIC SURFACTANT

[75] Inventors: Michael J. Sierakowski, Woodbury, Minn.; Frank A. Lee, La Porte, Tex.

[73] Assignee: Minnesota Mining and Manufacturing Company, St. Paul, Minn.

[21] Appl. No.: 774,201

[22] Filed: Oct. 10, 1991

[51] Int. Cl.$^5$ ............................................. C01G 3/00
[52] U.S. Cl. .................................... 423/27; 423/24; 423/34; 423/42; 75/718; 204/106; 204/108; 205/296
[58] Field of Search .................. 423/23, 24, 27, 34, 423/39, 42; 75/718; 204/106, 108, 107; 205/292, 291, 296

[56] References Cited

U.S. PATENT DOCUMENTS

| | | | |
|---|---|---|---|
| 2,732,398 | 1/1956 | Brice et al. | 260/503 |
| 2,759,019 | 8/1956 | Brown et al. | 260/556 |
| 2,764,602 | 9/1956 | Ahlbrecht | 260/404.5 |
| 2,764,603 | 9/1956 | Ahlbrecht | 260/404.5 |
| 2,803,656 | 9/1957 | Ahlbrecht et al. | 260/556 |
| 2,915,554 | 12/1959 | Ahlbrecht et al. | 260/556 |
| 3,450,755 | 6/1969 | Ahlbrecht | 260/556 |
| 3,787,351 | 1/1974 | Olson | 260/40 R |
| 4,000,168 | 12/1976 | Bertocchio et al. | 260/404.5 |
| 4,023,964 | 5/1977 | DeMarthe et al. | 423/27 |
| 4,069,119 | 1/1978 | Wong | 204/106 |
| 4,080,419 | 3/1978 | Engelmann | 423/32 |
| 4,090,967 | 5/1978 | Falk | 252/3 |
| 4,091,070 | 5/1978 | Riggs et al. | 423/41 |
| 4,102,916 | 7/1978 | Falk | 260/501.12 |
| 4,113,848 | 9/1978 | Parker | 423/512 A |
| 4,120,935 | 10/1978 | Fountain | 423/41 |
| 4,171,282 | 10/1979 | Mueller | 252/356 |
| 4,266,080 | 5/1981 | Falk et al. | 568/45 |
| 4,484,990 | 11/1984 | Bultman et al. | 204/106 |
| 4,536,298 | 8/1985 | Kamei et al. | 252/8.05 |
| 4,668,406 | 5/1987 | Chang | 252/8.75 |

FOREIGN PATENT DOCUMENTS 38028 1/1972 Australia.

OTHER PUBLICATIONS

E/MJ Oct. 1978, pp. 101–102.
"Copper," Kirk-Othmer, *Encyclopedia of Chemical Technology*, vol. 6, pp. 819–820 (3rd ed., John Wiley and Sons, 1979.
A. K. Biswas and W. G. Davenport, "Extractive Metallurgy of Copper," Ch. 13, pp. 254–269, Pergamon Press (1980).
"Solvent Extraction Reagents for the Mining Industry," Acorga Limited Technical Bulletin Arte/JP/0986 (unknown).
"Absorption of Nonionic/Anionic Surfactant Mixtures, Nonionic Surfactants and Its Effect on Mineral Dispersion and Wettability," Society for Mining, Metallurgy, and Exploration, Inc., Preprint No. 91–94 (1991).
"Effect of Nonionic Surfactants on Chalcopyrite Leaching Under Dump Chemical Conditions", U.S. Department of the Interior, Bureau of Mines, Report of Investigations 9311 (1990).
Guenthner et al., I&EC Product Res. & Dev., vol. 1, No. 3, 1962.
Fielding, "Organofluorine Chemicals and Their Industrial Applications," Banks, Ed., Ellis Horwood, Ltd., Chichester, England, 1979, Chapter 11, Organofluorine Surfactants and Textile Chemicals, pp. 214–234.

*Primary Examiner*—Theodore Morris
*Assistant Examiner*—Edward Squillante
*Attorney, Agent, or Firm*—Gary L. Griswold; Walter N. Kirn; Robert H. Brink

[57] ABSTRACT

Improved methods of heap leaching of copper ore with aqueous sulfuric acid solutions comprising a fluoroaliphatic surfactant are disclosed. The fluoroaliphatic surfactant increases the amount of copper values leached and recovered.

20 Claims, No Drawings

ACID LEACHING OF COPPER ORE HEAP WITH FLUOROALIPHATIC SURFACTANT

This invention relates to a process of aqueous acid leaching of copper ore heaps to produce aqueous solutions containing copper values which are then transferred by extraction into an organic medium, from which they can be recovered, for example, by electrowinning.

Copper has outstanding electrical and thermal conductivity and is highly malleable. The importance of copper is well described, for example, in "Copper," Kirk-Othmer, *Encyclopedia of Chemical Technology*, Vol. 6, pp 819-820 (3rd ed., John Wiley & Sons, 1979).

The cost of processing copper ore by smelting is rising due in part to the increasingly high cost of environmental controls required for new smelters. As an alternative to smelting, a variety of leaching methods have been developed to solubilize copper into aqueous solutions. Such methods include, for example, aqueous acid leaching of dumps of low grade mine waste sulfide ores or heaps of low grade surface oxide ore deposits, agitation leaching of concentrator tailings, in situ leaching of underground ore deposits, vat leaching of oxide ores from naturally occurring mine waters, and agitation leaching of by-products of smelter mattes and dosses.

Aqueous acid leaching techniques for extracting copper from low grade oxide ore heaps and sulfide ore dumps are well known. See, for example, A. K. Biswas and W. G. Davenport, "Extractive Metallurgy of Copper," Ch. 13, pp. 254-269, Pergamon Press (1980). See, also, "Solvent extraction reagents for the mining industry," Acorga Limited technical bulletin Artel/JB/0986, and Kirk-Othmer, supra. pp 847-852. Such aqueous acid leaching typically utilizes an aqueous solution of dilute sulfuric acid ("leachant"), which leaches, or dissolves, the copper from the ore. The aqueous acid leachant is typically sprayed on top of the heap or dump and allowed to percolate, or trickle, down by gravity between the ore pieces. At the bottom of the heap or dump, the resulting aqueous solution containing metal values ("pregnant leach solution") is recovered. In some cases the heap or dump is pretreated with a strong aqueous sulfuric acid solution prior to leaching with dilute sulfuric acid. See, for example, the processes described in U.S. Pat. No. 4,120,935 (Fountain et al.) and U.S. Pat. No. 4,091,070 (Riggs et al.). After the heap or dump has been treated with aqueous acid, the copper values can be recovered from the pregnant aqueous leaching solution by a variety of methods including, for example, cementation using iron scrap, ion exchange technology, and extraction-electrowinning.

In heap leaching, surface oxide ore deposits are broken and piled into heaps of about 100,000 to 500,000 tons. The solid materials in the heaps average about 10 cm in size. Heaps of copper oxide ores are described, for example, in "Extractive Metallurgy of Copper," Ch. 13, supra.

U.S. Pat No. 4,080,419 (Engelmann) describes a process for recovery of copper values by the foam leaching of a mass of copper-containing bodies, such as mill tailings, dumps, or heaps, with a stable, reagent-carrying foam. Said foam comprises ammonium carbonate or sulfuric acid and a surfactant, the surfactant employed in the examples being Tergitol ™ nonionic NPX (alkyl phenyl ether of polyethylene glycol).

In a preprint of a paper presented at the 1991 SME Annual Meeting (Feb. 25-28, 1991), namely, Q. Xu, P. Somasundaran, "Adsorption of Nonionic/Anionic Surfactant Mixtures, Nonionic Surfactants and Its Effect on Mineral Dispersion and Wettability", Society for Mining, Metallurgy, and Exploration, Inc., Preprint No. 91-94 (1991), certain hydrocarbon surfactant mixtures are said to be absorbed onto the surface of kaolinite and silica particles, thereby decreasing the hydrophobicity of the particle surface and increasing the wettability of the surface by aqueous solutions. The anionic and nonionic surfactants present in the mixture are said to interact synergistically to increase the wettability of the kaolinite surface.

A U.S. Bureau of Mines study by S. Sandoval, D. Pool, and L. Schultze, namely, "Effect of Nonionic Surfactants on Chalcopyrite Leaching Under Dump Chemical Conditions", U.S. Department of the Interior, Bureau of Mines, Report of Investigations 9311 (1990), was undertaken to investigate the application of surfactants as leaching aids in the dump leaching of chalcopyrite with ferric sulfate. The study reports that although the use of ferric sulfate to extract copper sulfide minerals has been known since prior to the turn of the century, inherent defects, such as slow and incomplete copper leaching, have never been satisfactorily resolved. The addition of certain hydrocarbon nonionic surfactants to ferric sulfate leaching solution is said to increase copper extraction from chalcopyrite when sufficient ferric ion is present.

U.S. Pat. No. 4,484,990 (Bultman et al.) describes a process for recovery of metal values, such as copper, comprising electrowinning said metal values from electrolyte containing sufficient fluoroaliphatic surfactant to provide mist-inhibiting foam on the surface of said electrolyte, said surfactant having at least one cationogenic group which is the radical of a base having an ionization constant in water at 25° C. of at least about $10^{-6}$ and containing at least about 30 weight percent fluorine in the form of carbon-bonded fluorine in a fluoroaliphatic radical, having at least 4 carbon atoms and at least a terminal perfluoromethyl group.

U.S. Pat. No. 4,102,916 (Falk), U.S. Pat. No. 4,171,282 (Mueller), and U.S. Pat. No. 4,266,080 (Falk) describe the preparation of certain perfluoroalkylthio compounds. The compounds are said to be useful to improve or impart properties such as wetting, penetration, spreading, etc. A list of potential applications set forth in these patents includes their use as wetting agents for leaching copper ores.

Briefly, the present invention provides, in one aspect, an improved method for aqueous acid leaching of copper values from a heap of low grade copper oxide ore, comprising: contacting, for example by spraying, with dilute aqueous sulfuric acid a heap of low-grade copper oxide ore (which is optionally pretreated with strong aqueous sulfuric acid) and allowing said aqueous acid to trickle, or percolate, through the heap; collecting the resulting pregnant aqueous solution; and transferring copper metal values from the pregnant aqueous solution into an organic medium which contains an ion exchange composition and from which the copper values can be recovered, for example, by transferring the copper values into an aqueous stripping solution followed by electrowinning. The improvement comprises dissolving, as a leaching-and-recovery aid or enhancer, fluoroaliphatic surfactant in the dilute and/or strong aqueous sulfuric acid. The fluoroaliphatic surfactant is soluble in said aqueous sulfuric acid solutions, is not extractable into said organic medium, and does not cause a stable emulsion to be formed during said extraction, the amount of said surfactant which is dissolved being an amount sufficient to increase the amount of copper values which are leached.

The fluoroaliphatic surfactants useful in this invention, which can be compounds, oligomers, or polymers, contain one or more fluoroaliphatic radicals and one or more water-solubilizing polar groups, said radicals and groups being connected by a suitable linking group or covalent bond. The surfactants preferably contain at least about 5% by weight fluorine, i.e. carbon-bonded fluorine, more preferably at least about 10%, the predominate amount or essentially all of which is located in the fluoroaliphatic radicals.

The fluoroaliphatic surfactants useful in the processes of this invention significantly increase the amount of copper which is leached and recovered from the ore. Said fluoroaliphatic surfactants are soluble, and not decomposed, in said dilute and strong aqueous sulfuric acids in an amount sufficient to act as a leaching and recovery aid or enhancer in the above processes, usually in at least 10 parts per million by weight (ppm). By "aid" or "enhancer" it is meant that the presence of the fluoroaliphatic surfactant, as compared to its absence, results in an increase in the amount of copper values leached from the ore and recovered after the subsequent solvent extraction. In order for the surfactant to not interfere with the solvent extraction, for example, by causing emulsification of the organic and aqueous phases, it should not be significantly extracted into the organic phase during the solvent extraction step. Furthermore, because the surfactant remains substantially in the aqueous leaching solution after extraction, the leaching solution may be recycled to the heap without the need to add significantly more fluoroaliphatic surfactant. The surfactant is preferably dissolved in the aqueous acid in sufficient amount to lower the surface tension of the aqueous acid, for example, to 40 dynes/cm or lower. For economic benefit and to reduce the probability of emulsification during the extraction step, it is preferable to use only as much of the surfactant as necessary in the aqueous leaching solution, preferably not more than 100 ppm.

In the present invention it has been found that dissolving a small amount, for example 10 to 100 ppm, of the fluoroaliphatic surfactant in the aqueous sulfuric acid leaching solution improves the amount of copper values leached and recovered. Generally, greater improvements are obtained with larger ore sizes, e.g., about 2 cm and larger, than with smaller sizes.

In contrast to the fluoroaliphatic surfactants useful in this invention, hydrocarbon surfactants are not suitable because they are degraded in aqueous sulfuric acid, or are incapable of lowering the surface tension of aqueous sulfuric acid sufficiently, for example, to 40 dynes/cm or lower, or are not compatible with the solvent extraction step. For example, 50 ppm Tween TM 40 surfactant only reduces the surface tension of aqueous sulfuric acid to about 45 dynes/cm; furthermore, the surface tension increases over time, indicating degradation of the surfactant and the hydrocarbon surfactant is not compatible with the solvent extraction step because it causes emulsification during the extraction step.

In the practice of the present invention, the manipulative steps and conditions of heap leaching, solvent extraction, and electrowinning which are improved by this invention are otherwise conventional steps or techniques. In solvent extraction, the pregnant aqueous leaching solution is mixed with, and the metal values extracted into, a water-immiscible organic medium, for example kerosene, containing a water-insoluble ion-exchange composition having selective affinity for the desired metal values. The resulting aqueous and organic phases are separated. The aqueous solution, now metal-depleted, is referred to as "raffinate" and is recycled to extract more copper from the ore. This recycling of the aqueous leaching solution is important in order for the leaching process to be economically feasible. After extraction, the copper values can be recovered from the organic medium by first removing, or stripping, the metal values into an aqueous stripping solution containing strong acid. The copper can then be recovered by electroplating ("electrowinning") the metal from the aqueous stripping solution. These conventional operations are well-known to those skilled in the art, and for purposes of brevity will not be further described in detail herein. Such methods are described, for example, in: Biswas and Davenport, supra; The Arcorga Limited technical bulletin, supra; Kirk-Othmer, supra, pp. 847-852; U.S. Pat. No. 4,120,935, supra; and U.S. Pat. No. 4,091,070, supra; which descriptions are incorporated herein by reference.

A particularly useful class of fluoroaliphatic surfactants which can be used in this invention are those which can be represented by Formula I:

  I

In Formula I, $R_f$ is a fluoroaliphatic radical or group, and n is 1 or 2. $R_f$ can be generally described as a fluorinated, preferably saturated, monovalent, non-aromatic radical of at least 3 carbon atoms. The fluoroaliphatic radial may be straight, branched, or, if sufficiently large, cyclic and may include oxygen, hexavalent sulfur, or trivalent nitrogen atoms bonded only to carbon atoms. A fully-fluorinated radical is preferred, but hydrogen or chlorine atoms may be present in the radical provided that not more than one atom of either is present for every two carbon atoms. While radicals containing a larger number of carbon atoms will function adequately, surfactants containing not more than about 20 carbon atoms are preferred since larger radicals usually represent a less efficient utilization of fluorine than is achieved with shorter chains. Fluoroaliphatic radicals containing about 4 to 12 carbon atoms are most preferred. The fluoroaliphatic radical preferably contains about 40% to about 78% fluorine by weight, more preferably about 50% to about 78% fluorine by weight. The terminal portion of the $R_f$ radical is a perfluorinated moiety which will preferably contain at least 7 fluorine atoms, e.g., $CF_3CF_2CF_2-$, $(CF_3)_2CF-$, $F_5SCF_2-$, or the like. The preferred $R_f$ radicals are fully or substantially fluorinated and are preferably those perfluorinated aliphatic radicals of the formula $-C_nF_{2n+1}$, where n, for example, is from 4 to 12.

In Formula I, Q is a linking group and x is 0 or 1. Note that when x is 0, Q is absent and $R_f$ and Z are linked by a covalent bond. Q is a multivalent linking group such as alkylene, e.g. methylene, ethylene, and cyclohexylene, arylene, e.g., phenylene, and combinations thereof, e.g., xylylene, or combinations of such moieties with such hetero-atom-containing moieties as oxy, thio, carbonyl, sulfonyl, sulfinyl, sulfonamido, carbonamido, ureylene, carbamato, and imino, e.g., combinations such as sulfonamidoalkylene, carbonamidoalkylene, oxydialkylene (e.g., —C$_2$H$_4$OC$_2$H$_4$—), thiodialkylene (e.g., —C$_2$H$_4$SC$_2$H$_4$—), alkylenecarbamato and the like. The Q groups for a specific composition will depend upon the specific reactants used in preparing the surfactant.

In Formula I, Z is a water-solubilizing polar group or moiety and is such that the fluoroaliphatic surfactant is soluble in, but not degraded in, the dilute and concentrated sulfuric acid. Furthermore, Z is such that the fluoroaliphatic surfactant does not cause emulsification and is not significantly extracted into the organic phase during the extraction step of this invention.

The water-solubilizing group Z can be a moiety or group which is anionic in sulfuric acid, examples of Z being sulfonates and sulfates, e.g. —SO$_3$H, —SO$_3$M, —OSO$_3$M, where M is a metal ion, such as sodium or potassium, or where M is an ammonium or other nitrogen-based cation.

The water-solubilizing group Z can be a moiety or group which is cationic or amphoteric in aqueous sulfuric acid. Typical cationic groups are —NH$_2$, —NHR, —NR$_2$, where R is lower alkyl group such as methyl, ethyl or butyl, —NR'$_3$A', where R' is such a lower alkyl group or hydrogen and A' is an anion such as chloride, sulphate, phosphate, hydroxyl, etc. Typical amphoteric groups include sulfoammonium and carboxyammonium groups such as —N$^+$(CH$_3$)$_2$C$_2$H$_4$COO$^-$ and —SO$_2$N(CH$_2$CH$_2$COO$^-$)C$_3$H$_6$N$^+$(CH$_3$)$_2$H.

The water-solubilizing group Z can be a moiety or group which is nonionic in aqueous sulfuric acid, such as poly(oxyalkylene). Suitable nonionic groups are poly(oxyethylene) containing less than about 30 oxyethylene units, e.g., —(C$_2$H$_4$O)$_7$CH$_3$.

Z cannot be a group, such as carboxylate and phosphate, which is nonionic, i.e., not ionized, in sulfuric acid, because a fluoroaliphatic surfactant containing such a Z is insoluble in aqueous sulfuric acid and/or is extracted into the organic phase. Examples of unsuitable surfactants are C$_8$F$_{17}$SO$_2$N(C$_2$H$_5$)C$_2$H$_4$OP(O)-(ONH$_4$)$_2$ and C$_7$F$_{15}$CO$_2$NH$_4$, which are insoluble in aqueous sulfuric acid, and C$_8$F$_{17}$SO$_2$N(C$_2$H$_5$)CH$_2$CO$_2$K, which is extracted into the organic phase.

Z cannot be a nonionic group which is predominately composed of oxypropylene units or which contains more than about 30 oxyalkylene units, because a fluoroaliphatic surfactant containing such a Z causes emulsification of the aqueous and organic phases during the extraction step, or is insoluble in aqueous sulfuric acid. Examples of unsuitable surfactants are C$_8$F$_{17}$SO$_2$N(C$_2$H$_5$)(C$_2$H$_4$O)$_{39}$CH$_3$, which results in emulsification during the extraction step, and C$_8$F$_{17}$SO$_2$N(C$_2$H$_5$)(C$_3$H$_6$O)$_7$CH$_3$, which is insoluble in aqueous sulfuric acid.

Representative anionic fluoroaliphatic surfactants useful in this invention are:
C$_8$F$_{17}$SO$_3$K
C$_8$F$_{17}$SO$_2$NHCH$_2$C$_6$H$_4$SO$_3$Na
C$_8$F$_{17}$SO$_2$NHC$_6$H$_4$SO$_3$K
C$_8$F$_{17}$C$_2$H$_4$SC$_2$H$_4$CONHC(CH$_3$)$_2$CH$_2$SO$_3$Na
C$_{10}$F$_{19}$OC$_6$H$_4$SO$_3$Na
(CF$_3$)$_2$CF(CF$_2$)$_4$CONHC$_2$H$_4$SO$_3$Na
C$_8$F$_{17}$C$_2$H$_4$OSO$_3$K
C$_{10}$F$_{21}$SO$_3$NH$_4$
F$_5$S—C$_4$F$_8$—SO$_3$K
C$_4$F$_9$C$_2$H$_4$OC(O)CH$_2$CH(SO$_3$Na)C(O)OC$_2$H$_4$C$_4$F$_9$ (a mixture of surfactants where some C$_4$F$_9$ groups are straight-chain and some are branched chain)

Anionic fluoroaliphatic surfactants useful in this invention are described inter alia in Guenthner et al., I & EC Product Res. & Dev., Vol. 1, No. 3, 165-169 (1962); in Fielding, "Organofluorine Chemicals and Their Industrial Applications," Banks, Ed., Ellis Horwood, Ltd., Chichester, England, 1979, Chapter 11, "Organofluorine Surfactants and Textile Chemicals," pages 214-234, and references cited therein; in U.S. Pat. No. 2,732,398 (Brice et al.), U.S. Pat. No. 2,803,656 (Ahlbrecht et al.), and in U.S. patent application Ser. No. 07/728,184 (Dams et al.); all of said descriptions are incorporated herein by reference.

Representative cationic fluoroaliphatic surfactants useful in this invention are:
C$_6$F$_{13}$SO$_2$NHC$_3$H$_6$N$^+$(CH$_3$)$_3$Cl$^-$
C$_8$F$_{17}$SO$_2$NHC$_3$H$_6$N$^+$(CH$_3$)$_3$CH$_3$SO$_4$$^-$
C$_8$F$_{17}$C$_2$H$_4$SC$_2$H$_4$CONHC$_2$H$_4$N$^+$(CH$_3$)$_3$Cl$^-$
C$_6$F$_{13}$SO$_2$NHC$_3$H$_6$N$^+$(CH$_3$)$_2$C$_2$H$_4$OHOH$^-$
C$_6$F$_{13}$SO$_2$N(CH$_2$CH$_2$OH)C$_3$H$_6$N$^+$(CH$_3$)$_2$C$_2$H$_4$OHOH$^-$
C$_8$F$_{17}$SO$_2$NHC$_3$H$_6$N$^+$(CH$_3$)$_3$I$^-$
C$_8$F$_{17}$SO$_2$NHC$_3$H$_6$N$^+$(CH$_3$)$_3$Cl$^-$
C$_6$F$_{13}$SO$_2$NHC$_3$H$_6$2N$^+$(CH$_3$)$_3$Cl$^-$
C$_6$F$_{13}$SO$_2$NHC$_3$H$_6$N(CH$_3$)$_2$
C$_6$F$_{13}$SO$_2$NHC$_3$H$_6$N(CH$_3$)$_2$>O
C$_6$F$_{13}$C$_2$H$_4$SO$_2$NHC$_3$H$_6$N$^+$(CH$_3$)$_3$OH$^-$
C$_8$F$_{17}$C$_2$H$_4$N$^+$(CH$_3$)$_2$C$_2$H$_4$OHOH$^-$

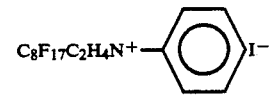

C$_{10}$F$_{19}$OC$_6$H$_4$SO$_2$NHC$_3$H$_6$N(CH$_3$)$_2$
(CF$_3$)$_2$CFOC$_2$F$_4$CONHC$_3$H$_6$NH$_2$
F$_5$SC$_4$F$_8$SO$_2$NHC$_3$H$_6$N$^+$(CH$_3$)$_3$Cl$^-$

Cationic fluoroaliphatic surfactants useful in this invention are described inter alia in Guenthner et al. supra, Fielding, supra, and in U.S. Pat. No. 2,759,019 (Brown et al.), U.S. Pat. No. 2,764,602 (Ahlbrecht), U.S. Pat. No. 2,764,603 (Ahlbrecht), U.S. Pat. No. 4,484,990 (Bultman et al.), U.S. Pat. No. 3,450,755 (Ahlbrecht), and U.S. Pat. No. 4,000,168 (Bertocchio et al.), all of said descriptions are incorporated herein by reference.

Representative amphoteric fluoroaliphatic surfactants useful in this invention are:
C$_6$F$_{13}$SO$_2$N(CH$_2$CH(OH)CH$_2$SO$_3$$^-$)C$_3$H$_6$N$^+$(CH$_3$)$_2$C$_2$H$_4$OH
C$_6$F$_{13}$SO$_2$N(CH$_3$H$_6$SO$_3$$^-$)C$_3$H$_6$N$^+$(CH$_3$)$_2$C$_2$H$_4$OH
C$_7$F$_{15}$CONHC$_3$H$_6$N$^+$(CH$_3$)$_2$C$_2$H$_4$COO$^-$
C$_6$F$_{13}$C$_2$H$_4$SO$_2$N(CH$_3$)C$_2$H$_4$N$^+$(CH$_3$)$_2$C$_2$H$_4$COO$^-$
C$_6$F$_{13}$SO$_2$NHC$_3$H$_6$N$^+$(CH$_3$)$_2$CH$_2$CH$_2$COO$^-$
C$_8$F$_{17}$SO$_2$NHC$_3$H$_6$N(CH$_3$)C$_3$H$_6$SO$_3$Na
C$_8$F$_{17}$SO$_2$NHC$_3$H$_6$N(C$_2$H$_4$OH)C$_3$H$_6$SO$_3$Na
C$_7$F$_{15}$CONHC$_3$H$_6$N(CH$_3$)C$_3$H$_6$SO$_3$Na
C$_6$F$_{13}$SO$_2$N(C$_2$H$_5$)C$_3$H$_6$NHCH$_2$CH(OH)CH$_2$SO$_3$Na
C$_4$F$_9$SO$_2$NHC$_3$H$_6$N$^+$(CH$_3$)$_2$CH$_2$COO$^-$
C$_6$F$_{13}$C$_2$H$_4$SC$_2$H$_4$N$^+$(CH$_3$)$_2$CH$_2$COO$^-$
C$_6$F$_{13}$SO$_2$NHC$_3$H$_6$N$^+$(CH$_3$)$_2$C$_3$H$_6$SO$_3$$^-$
C$_6$F$_{13}$SO$_2$N(C$_2$H$_4$CO$_2$$^-$)C$_3$H$_6$N$^+$(CH$_3$)$_2$H
C$_6$F$_{13}$SO$_2$N(CH$_2$COONa)C$_3$H$_6$N$^+$(CH$_3$)$_3$OH$^-$
C$_6$F$_{13}$SO$_2$N(C$_2$H$_4$COONa)C$_3$H$_6$N$^+$(CH$_3$)$_2$C$_2$H$_4$COO$^-$
C$_8$F$_{17}$CH$_2$CH(COO$^-$)N$^+$(CH$_3$)$_3$
(CF$_3$)$_2$CFOC$_3$F$_6$CONHC$_2$H$_4$N$^+$(CH$_3$)$_2$C$_2$H$_4$COO$^-$
C$_{10}$F$_{19}$OC$_6$H$_4$SO$_2$N(CH$_2$COONa)C$_3$H$_6$N(CH$_3$)$_2$ Amphoteric fluoroaliphatic surfactants useful in this invention are described inter alia in Guenthner et al. and Fielding, supra, and in U.S. Pat. No. 4,090,967 (Falk), U.S. Pat. No. 4,536,298 (Kamei et al.), and U.S. Pat. No. 4,484,990 (Bultman et al.), and Australian Patent Specification No. 38,028/72 (Pavlik), all of which descriptions are incorporated herein by reference.

Representative nonionic fluoroaliphatic surfactants useful in this invention are:

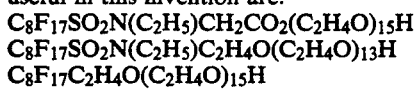

$C_8F_{17}SO_2N(C_2H_5)CH_2CO_2(C_2H_4O)_{15}H$
$C_8F_{17}SO_2N(C_2H_5)C_2H_4O(C_2H_4O)_{13}H$
$C_8F_{17}C_2H_4O(C_2H_4O)_{15}H$

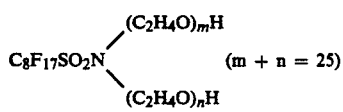

Nonionic fluoroaliphatic surfactants useful in this invention are described inter alia, for example, in Guenthner et al., supra, and Fielding, supra, and in U.S. Pat. No. 2,915,554 (Ahlbrecht et al.), all of which descriptions are incorporated herein by reference.

A second class of fluoroaliphatic surfactants useful in this invention includes oligomers and polymers which have a plurality of pendant fluoroaliphatic groups depending from an oligomeric or polymeric backbone and containing water-solubilizing moieties selected from anionic, cationic, nonionic and amphoteric moieties, and compatible combinations of such moieties. Such water-solublizing moieties are preferably poly(oxyalkylene) moieties. Particularly preferred poly(oxyalkylene) moieties are those in which at least 40% of the oxyalkylene repeat units are oxyethylene. These fluorochemical oligomers or polymers are preferably non-ionic and normally liquid or low-melting solids. They preferably have about 5 to 40 weight percent, more preferably about 10 to 30 weight percent carbon-bonded fluorine, based on the weight of oligomer or polymer, the fluorine content residing in said plurality of pendant fluoroaliphatic radicals. These materials are preferably relatively low molecular weight linear, branched, or lightly crosslinked polymers, containing from 3 to 4 up to about 25 or 30 monomer-derived or interpolymerized units, and thus are oligomeric, as contrasted to "high polymers" having a molecular weight of 100,000 or higher. A particularly useful class of poly(oxyalkylene)-containing oligomers or polymers includes polyacrylates with pendant fluoroaliphatic groups. Oligomers and polymers of these types are described, for example, in U.S. Pat. No. 4,668,406 (Chang) and U.S. Pat. No. 3,787,351 (Olson), both of which descriptions are incorporated herein by reference.

Compatible mixtures of the above defined useful fluoroaliphatic surfactants, including compounds, oligomers and polymers, can also be used in the processes of this invention.

Objects and advantages of this invention are illustrated in the Examples below.

EXAMPLES

In the following examples, fluoroaliphatic surfactants were dissolved in aqueous acid solutions which were then used for the leaching of copper metal values from copper ore. Copper ore was placed in columns and aqueous sulfuric acid solutions were used to leach copper metal values from the ore. The conditions simulated those of heap leaching.

In order to ensure uniform ore size distribution in each column, all ore was initially crushed in a jaw crusher, then separated into various sizes using a Gilson Test-Master Screen Apparatus through 1 inch (2.54 cm), ¾ inch (1.9 cm), ½ inch (1.27 cm), ⅜ inch (0.95 cm), ¼ inch (0.64 cm), and 10 mesh screens. The ore fractions were combined such that each column contained uniform ore size distribution.

The primary acid-soluble copper mineralization in the copper ore used was chrysocolla. Analysis of the ore showed the ore contained 0.57% copper, 0.54% acid soluble non-sulfide copper, and 2.40% iron.

The columns used were 8-inch (20.3 cm) diameter, 6-feet (1.83 m) high, and constructed from polyvinylchloride pipe. Ore was loaded into each column until filled to a nominal height of 6 feet (1.83 m).

The ore was leached with an aqueous leaching solution containing 10 gram per liter of sulfuric acid and 3 gram per liter of ferric ion (added as ferric sulfate). The leach solution pH was less than 1.5. The leach solution was added to each column at a rate of 0.0025 gallons (0.0095 liters) per minute for 60 days.

Four different fluoroaliphatic surfactants were evaluated and results from the use thereof were compared to results from a control column where no surfactant was used. Each fluoroaliphatic surfactant was dissolved in the leaching solution at a concentration of 50 ppm. To reach this low surfactant level consistently, a 1% aqueous solution of each surfactant was prepared and diluted to the end-use concentration. The 1% solutions were allowed to sit in covered Ehrlenmeyer flasks overnight to allow any foam to settle that may have formed during preparation. The 1% solutions were added to the synthetic acid leach solution to produce the final 50 ppm concentration for each surfactant. The leach solutions were agitated gently (in order to not produce foam in the leach solution) on a daily basis to ensure uniform distribution of the surfactant in the leach solution. A 180-liter batch of each fluoroaliphatic surfactant-containing leaching solution was prepared for each column, with subsequent batches made as needed. No surfactant was added to the leach solution applied to one column which was used as the control column. After the leaching was completed, the ore in each column was again separated into the different particle sizes, as above, and each fraction was analyzed for percent copper extracted. The results of the different sizes analyzed are shown in Table 1.

EXAMPLE 1

The fluoroaliphatic surfactant of structure $C_8F_{17}SO_2N(H)CH_2CH_2CH_2N^+(CH_3)_3Cl^-$ was prepared as described in U.S. Pat. No. 2,759,019 (Brown et al.). Ninety grams of a 10% by weight aqueous solution of the surfactant was diluted to 90 grams using deionized water to produce a 1% solution. This 1% solution was charged to a volume of the aqueous leaching solution described above to make a 180-liter batch containing 50 ppm of the fluoroaliphatic surfactant.

A column was charged with 88.85 kg of the ore filling the column to a height of 5.79 feet (1.76 meters). The column was leached for 60 days with the surfactant containing leaching solution at the specific application rate of 0.0025 gallons per minute per square foot (0.10 liters per minute per square meter) of surface area in the column. After 60 days of leaching, each column was washed with water for one day at 0.0025 gallons per minute per square foot (0.10 liters per minute per square meter). The height of the ore in the column after 60 days of leaching was 5.73 feet (1.75 meters). Samples of the copper-bearing leach solution were collected daily and analyzed for copper, iron, and free acid. The analysis showed that 77.18% copper was leached, which is significantly more than the 72.52% leached from the control column.

EXAMPLE 2

The fluoroaliphatic surfactant of structure $C_6F_{13}SO_2N(CH_2CH(OH)CH_2SO_3\text{-}Na)CH_2CH_2CH_2N^+(CH_3)_2CH_2CH_2OH$ was prepared as described in Example 1 of U.S. Pat. No. 4,484,990 (Bultman et al.). As in Example 1, aqueous leaching solution containing 50 ppm of the surfactant was prepared and applied to a column containing 90.80 kg of prepared ore with an initial column height of 6.00 feet (1.83 m) and a column height of 5.94 feet (1.81 m) after the 60 days of leaching. Column treatment during and after leaching was as in Example 1. The analysis showed that 77.31% copper was leached, which is significantly more than the 72.52% leached from the control column.

EXAMPLE 3

The fluoroaliphatic surfactant of structure $C_6F_{13}SO_2N(H)C_3H_6N^+(CH_3)_3Cl^-$ was prepared as described in U.S. Pat. No. 2,759,019 (Brown et al.). As in Example 1, aqueous leaching solution containing 50 ppm of the fluoroaliphatic surfactant was prepared and applied to a column containing 90.80 kg of prepared ore with an initial ore column height of 6.04 feet (1.84 m) and a height of 5.94 feet (1.81 m) after 60 days of leaching. Column treatment during and after leaching was as in Example 1. The analysis showed that 75.62% copper was leached, which is significantly more than the 72.52% leached from the control column.

EXAMPLE 4

The fluoroaliphatic surfactant of structure $C_4F_9C_2H_4OC(O)CH_2CH(SO_3Na)C(O)C_2H_4C_4F_9$ was prepared as described in copending U.S. patent application Ser. No. 07/728,184. As in Example 1, aqueous leaching solution containing 50 ppm test solution of the fluoroaliphatic surfactant was prepared and applied to a column containing 88.71 k of prepared ore with an initial column height of 5.85 feet (1.8 m) and a column height of 5.75 feet (1.75 m) after the 60 days of leaching. Column treatment during and after leaching was as in Example 1. The analysis showed that 76.13% copper was leached, which is significantly more than the 72.52% leached from the control column.

COMPARATIVE EXAMPLE C1

In this control example, no fluoroaliphatic surfactant was added to the aqueous leaching solution that was applied to the column. The column contained 90.80 kg of prepared ore with an initial ore column height of 5.92 feet (1.80 m) and an ore column height of 5.92 feet (1.80 m) after 60 days of leaching. Column treatment before and after leaching was as in Example 1. The analysis showed that 72.52% copper was leached.

The foregoing data on the amount of copper leached show a significant increase in copper leached when leaching solutions containing the fluoroaliphatic surfactants were used compared to Comparative Example C1 which used a leaching solution which did not contain fluoroaliphatic surfactant.

TABLE 1

PERCENT COPPER EXTRACTION BY SCREEN FRACTION

| Example | +¾" 1.9 cm | +½" 1.27 cm | +⅜" 0.95 cm | +¼" 0.64 cm | +10 Mesh | −10 Mesh |
|---|---|---|---|---|---|---|
| C1 | 48.00 | 60.78 | 69.39 | 74.00 | 81.48 | 77.27 |
| 1 | 58.00 | 66.67 | 73.47 | 80.00 | 83.33 | 80.68 |
| 2 | 56.00 | 66.67 | 75.51 | 80.00 | 83.33 | 81.82 |
| 3 | 50.00 | 66.67 | 71.43 | 80.00 | 83.33 | 80.68 |
| 4 | 58.00 | 60.78 | 75.51 | 80.00 | 83.33 | 81.82 |

The data in Table 1 surprisingly and unexpectedly show that in Examples 1 and 2 amounts of copper leached from the coarser (larger) size fractions improved more, relative to the Comparative Example, than in the smaller size ore fractions. Because actual heap leaching will involve a greater percentage of larger particles, these surprising results show that the process of this invention will give even greater increases in leaching in actual heap leaching conditions.

Samples of copper-bearing leach solution were collected from Example 1 and extracted with an organic solution of 93 mL Phillips Orfom ™ SX-7 diluent and 7 mL Acorga ™ M-5640 extractant. The resulting organic phase was separated and extracted with an aqueous stripping solution of 120 g $CuSO_4 \cdot 3H_2O$ and 150 g 18M $H_2SO_4$ in 890 g deionized water. The resulting aqueous phase was separated and placed in a glass jar equipped with a lead anode and a copper cathode. After each extraction the resulting aqueous and organic phases rapidly separated without the formation of an emulsion. Electroplating was initiated at a current density of 0.150 ampere/$cm^2$. Gas was immediately observed at the anode when the current was applied and the color of the aqueous solution near the cathode changed color from blue to green. After applying current for 30 minutes the cathode was removed and brown-red dendritic copper deposits were observed.

The various modifications and alterations of this invention will be apparent to those skilled in the art without departing from the scope and spirit of this invention and this invention should not be restricted to that set forth herein for illustrative purposes.

We claim:

1. In a method for leaching of copper ore comprising the steps of:
   (A) contacting a heap of low grade copper oxide ore with an aqueous leaching solution comprising sulfuric acid and allowing said solution to flow through the heap;
   (B) collecting the resulting pregnant aqueous solution; and
   (C) transferring copper values from the aqueous solution into an organic medium by extraction; the improvement comprising dissolving in said aqueous leaching solution a fluoroaliphatic surfactant which is soluble in said aqueous leaching solution, is not extracted into said organic medium, and does not cause a stable emulsion to be formed during said extraction, the amount of said surfactant which is dissolved being an amount sufficient to increase the amount of copper values which are leached.

2. The method of claim 1 further comprising the steps of:
   (D) transferring the copper values from the organic medium into an aqueous stripping solution; and (E) recovering copper from said aqueous stripping solution by electrowinning.

3. The method of claim 1 wherein said fluoroaliphatic surfactant is represented by the formula $$(R_f)_n(Q)_x Z$$

wherein $R_f$ is a fluoroaliphatic group; n is 1 or 2; Q is a linking group; x is 0 or 1; and Z is a water-solubilizing group.

4. The method of claim 3 wherein said Z is selected from the group consisting of sulfonate, sulfate, ammonium, sulfo-ammonium, carboxy-ammonium, and poly(oxyalkylene).

5. The method of claim 4 wherein at least 40 percent of the oxyalkylene units of said poly(oxyalkylene) are oxyethylene and wherein there are 30 or less of said oxyalkylene units.

6. The method of claim 1 wherein said amount of said fluoroaliphatic surfactant dissolved in said aqueous leaching solution is from 10 to 100 parts per million by weight.

7. The method of claim 6 wherein said fluoroaliphatic surfactant is $C_8F_{17}SO_2N(H)CH_2CH_2CH_2N^+(CH_3)_3Cl^-$.

8. The method of claim 1 wherein said fluoroaliphatic surfactant is a polymer which has a backbone having pendant fluoroaliphatic groups and which contains water-solubilizing moieties.

9. The method of claim 8 wherein said polymer is a polyacrylate.

10. The method of claim 8 wherein said water-solubilizing moieties are poly(oxyalkylene) moieties.

11. The method of claim 10 wherein at least 40 percent of the oxyalkylene units of said poly(oxyalkylene) are oxyethylene.

12. In a method for leaching copper ore comprising the steps of:
(A) contacting a heap of low-grade copper oxide ore with a strong aqueous sulfuric acid leaching solution and allowing the ore to remain in contact with the solution for a period from about 3 to about 30 days;
(B) contacting said heap with a dilute aqueous sulfuric acid leaching solution and allowing said dilute aqueous sulfuric acid solution to flow through the heap;
(C) collecting the resulting pregnant aqueous solution; and
(D) transferring copper values from the aqueous solution into an organic medium by extraction; the improvement comprising dissolving in either or both of said sulfuric acid leaching solutions a fluoroaliphatic surfactant which is soluble in said leaching solutions, is not extracted into said organic medium, and does not cause a stable emulsion to be formed during said extraction, the amount of said surfactant which is dissolved being an amount sufficient to increase the amount of copper values which are leached.

13. The method of claim 12 further comprising the steps of:
(E) transferring the copper values from the organic medium into an aqueous stripping solution; and
(F) recovering copper from said aqueous stripping solution by electrowinning.

14. The method of claim 12 wherein said fluoroaliphatic surfactant is represented by the formula $$(R_f)_n(Q)_x Z$$

wherein $R_f$ is a fluoroaliphatic group; n is 1 or 2; Q is a linking group; x is 0 or 1; and Z is a water-solubilizing group.

15. The method of claim 14 wherein said Z is selected from the group consisting of sulfonate, sulfate, ammonium, sulfo-ammonium, carboxy-ammonium, and poly(oxyalkylene).

16. The method of claim 15 wherein at least 40 percent of the oxyalkylene units of said poly(oxyalkylene) are oxyethylene and wherein there are 30 or less of said oxyalkylene units.

17. The method of claim 12 wherein said fluoroaliphatic surfactant is a polymer which has a backbone having pendant fluoroaliphatic groups and which contains water-solubilizing moieties.

18. The method of claim 17 wherein said polymer is a polyacrylate.

19. The method of claim 17 wherein said water-solubilizing moieties are poly(oxyalkylene) moieties.

20. The method of claim 19 wherein at least 40 percent of the oxyalkylene units of said poly(oxyalkylene) are oxyethylene.

* * * * *